March 20, 1956 G. W. ULLMAN 2,739,023

TURNTABLE CABINET

Filed July 1, 1953 2 Sheets-Sheet 1

INVENTOR.
GEORGE W. ULLMAN.
BY [signature]
AGENT.

March 20, 1956 G. W. ULLMAN 2,739,023

TURNTABLE CABINET

Filed July 1, 1953 2 Sheets-Sheet 2

INVENTOR.
GEORGE W. ULLMAN.
BY
Alexander T. Stewart
AGENT.

2,739,023

TURNTABLE CABINET

George W. Ullman, New York, N. Y.

Application July 1, 1953, Serial No. 365,311
3 Claims. (Cl. 312—251)

The present invention relates to a turntable cabinet so constructed that the extent of the rotation thereof is restricted to a predetermined angle of rotation.

The turntable cabinet herein described is one which is especially adapted to contain a radio, for example, in one end thereof and a telephone, for example, in the other end thereof, and which is either open ended or which may be opened at either end to permit access to and use of either of the devices contained therein. A device of the type described is of particular utility as a desk side or bedside addition by permitting the use by a person seated or reclining of either of the devices contained in the cabinet without undue inconvenience to such person, since the cabinet may be turned by a touch of the hand so as to bring either the radio or the telephone within easy reach.

A turntable cabinet, however, which is not limited in the extent of its rotation, that is, one which can be turned continuously in either direction, is not particularly suited for use where a plurality of electrical devices are to be contained therein since constant rotation of such a cabinet in any one direction will cause the lead-in wires to become twisted about each other and eventually result in an inconvenient stoppage of rotation in such direction. Such indiscriminate rotation of the cabinet would also tend to reduce the effective life of the lead-in wires by the constant twisting and turning of the wires and could be the cause of unpleasant and perhaps serious consequences as a result of a possible short circuit should the said wires eventually break.

Such happenings, however, are substantially completely avoided in the turntable cabinet construction made in accordance with the present invention as will be apparent from the accompanying drawings and following detailed description.

In the drawings in which like characters of reference designate like parts throughout—

Figures 1, 3:
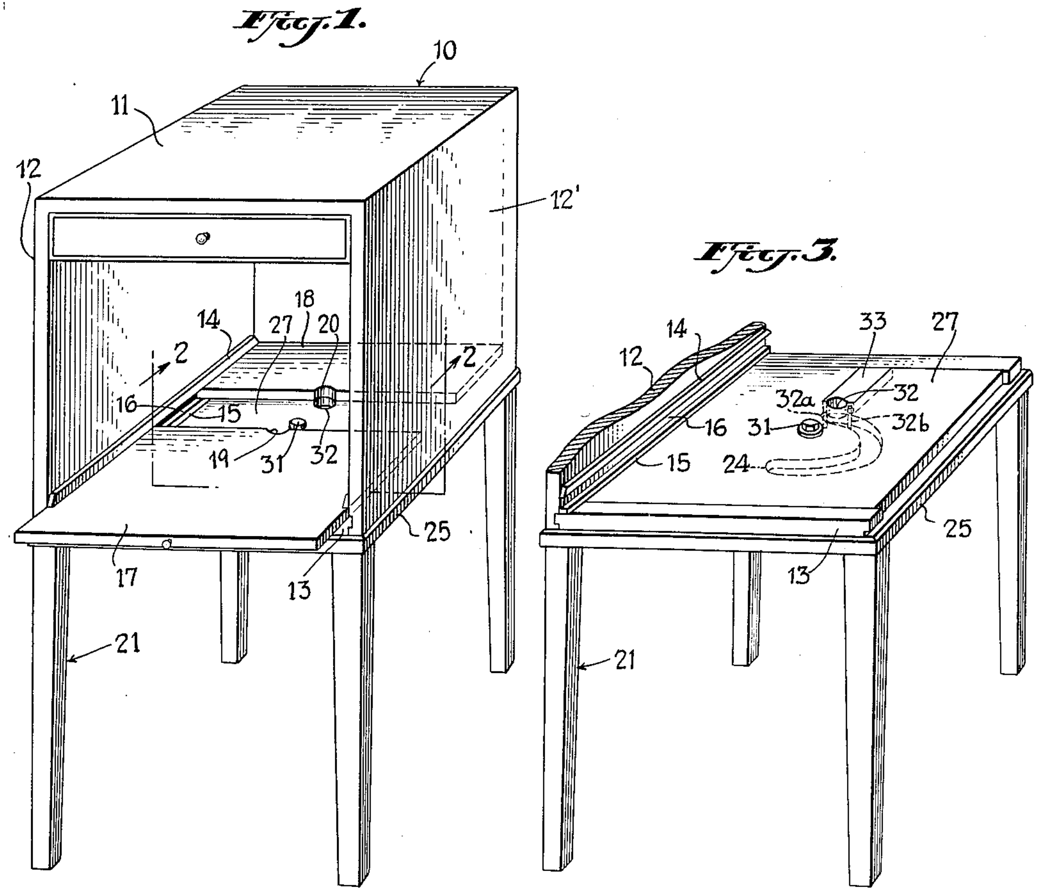
Fig. 1 is a perspective view of a turntable cabinet embodying the features of the present invention.
Fig. 3 is a perspective view of a turntable support embodying the features of the present invention.
Figures 4, 4A, 5:
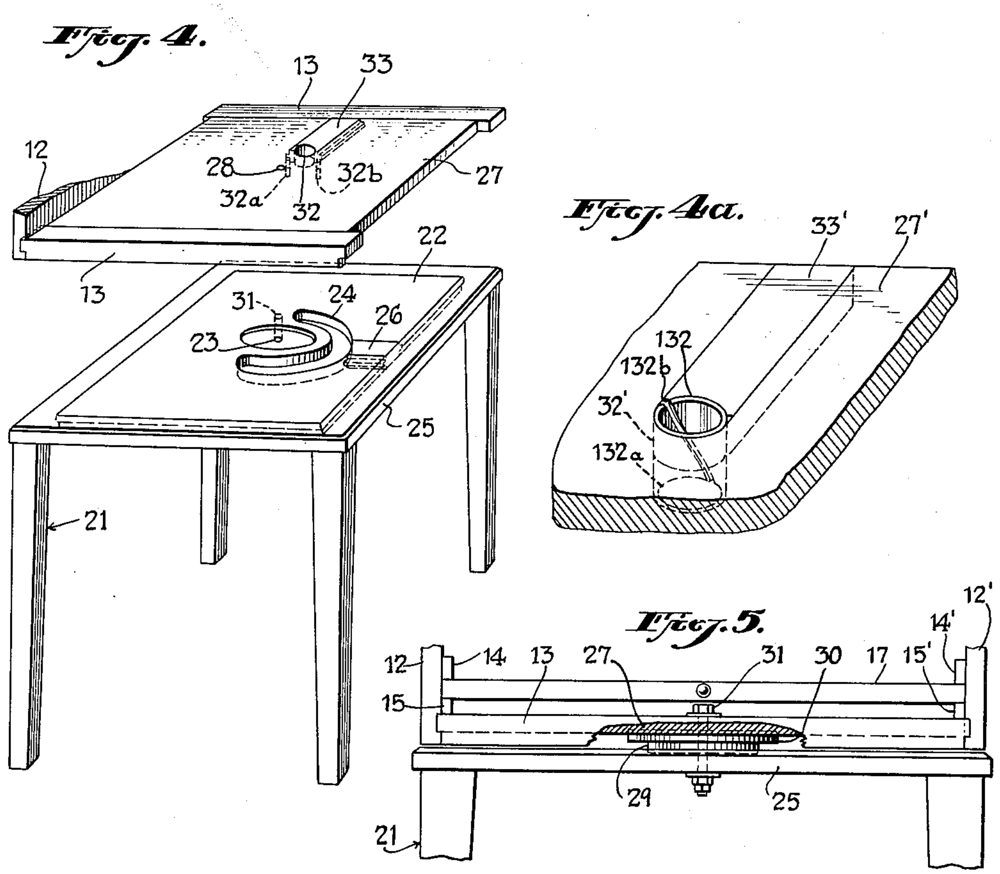
Fig. 4 is an exploded perspective view from above of the turntable support shown in Fig. 3.
Figure 6:
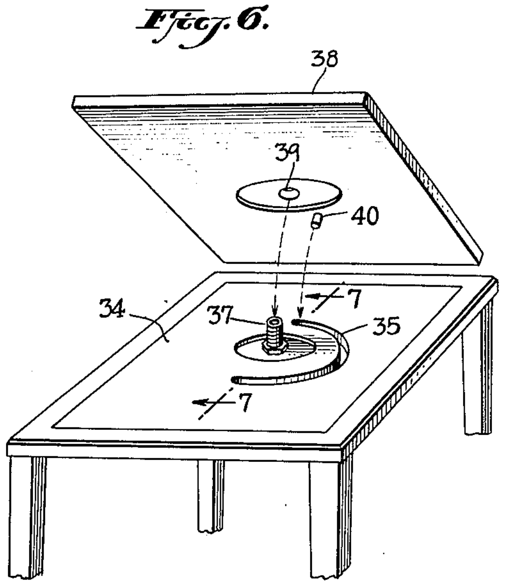
Figure 7:
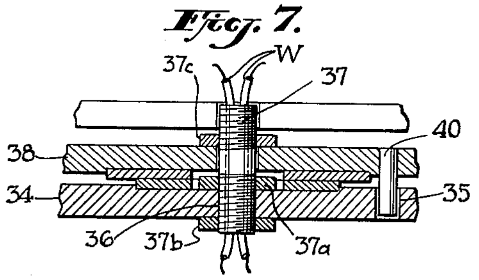

Fig. 4*a* is a fragmentary perspective view showing a structure identical with that of Figs. 1–4 except for a modified form of stop;

Fig. 5 is a front elevational view of the top portion of the turntable support shown in Figs. 3 and 4 showing the bearing means supporting a turntable plate and spindle means connecting the turntable plate with the top section of a stand;

Fig. 6 is an exploded perspective view of the upper portion of another embodiment of a turntable support showing the top section of a stand and a turntable plate; and Fig. 7 is a cross sectional view, taken on line 7—7 of Fig. 6, somewhat enlarged.

In the drawings, Fig. 1 illustrates one embodiment of a turntable cabinet of the invention comprising a cabinet 10 having a top 11 and sides 12 and 12′. The lower part of the sides 12 and 12′ are rigidly connected by front and rear cross pieces, one of which is indicated at 13. On the inner side of the lower part of each of the sides 12 and 12′ there are mounted in parallel relation upper and lower horizontal slat members indicated at 14—15 and 14′—15′, the said upper and lower slat members forming guide-ways on the inner sides of the cabinet, one such guide-way being indicated at 16. Mounted in the guide-ways are shelves 17 and 18, each of said shelves having an indentation on its inner edge as indicated at 19 and 20. The shelves 17 and 18 each serve to support a device such as a radio, telephone, dictaphone or the like, and may be fixedly mounted in the guide-ways or they may be individually slidable, as shown in Fig. 1, to permit each shelf to be pulled out to provide ready accessibility to and freer use of the particular device which is carried thereon. In such cases where the particular device contained in the cabinet need not be withdrawn from the cabinet for ready access thereto and free use thereof, a single shelf having a hole therein to provide an outlet for wires may be mounted in the lower portion of the cabinet to constitute the entire bottom thereof.

As a carrier for the cabinet there is provided a turntable support which, in the embodiment shown in Figs. 3, 4 and 5, includes a suitable stand 21 having a horizontal top section 22, said top section 22 having a hole 23 centered on the axis of rotation of the turntable cabinet, preferably at its center, and also having a semi-circular cut-out 24 therein whose center of curvature coincides with said axis of rotation. The top section 22 of the turntable stand 21 may suitably be either fixedly mounted on the legs or other support for the stand, or it may consist of a sheet of rigid material removably mounted within a framework 25 which itself is fixedly mounted upon the legs of the stand. A snugly fitted block 26 fills a cut-out which extends from the semi-circular cut-out 24 in the top section of the stand to the outer edge of said top section and may be removed to permit entry into the semi-circular cut-out of the wires of a telephone, for example, if such device is to be contained in the cabinet, without the necessity of disconnecting the wires.

A turntable plate 27, having a hole 28 centered on said axis of rotation is supported in spaced parallel relation upon the top section 22 of the turntable stand by suitable bearing means which in the embodiment shown consists of a flat smooth-surfaced washer 29 which is partially recessed in the upper surface of the top section 22 and fastened thereto, and a second flat smooth-surfaced washer 30 which is partially recessed in the under surface of the turntable plate 27 and fastened thereto. The turntable plate 27 and the top section 22 of the turntable stand 21 are connected and held in operable alignment with respect to each other by means of a bolt member 31 which passes through the holes 23 and 28 of the respective members and which acts as a spindle for the turntable plate 27 during rotation thereof. A suitable lubricant applied to the contacting surfaces of washers 29 and 30 provides for easy rotation of the turntable plate 27 even when supporting a cabinet such as that shown in Fig. 1. The bearing means for the turntable plate need not be that which is described herein but may be any suitable bearing device which will support the turntable plate in spaced parallel relation with the top section of the turntable stand to permit rotation of the turntable plate thereon. The turntable plate 27 has a second hole 32 therein which is radially spaced from the axis of rotation a distance equal to the radius of curvature of the semi-circular cut-out 24.

A block 33, serving the same purpose as the block 26, is snugly fitted into a cut-out which extends from the hole 32 to the outer edge of the turntable plate 27.

Referring to Figs. 3 and 4: a pair of pins are secured in plate 27 on respectively diametrically opposite sides of the hole 32, radially spaced from the axis of rotation a distance equal to the radius of curvature of the semi-circular cut-out 24, and their lower ends project beneath the plate 27. When the turntable plate 27 is positioned as indicated in Figs. 1–4, the pins 32*a* and 32*b* extend into the cut-out 24 and act as stops which limit the extent of rotation of the turntable plate or of a cabinet which may be supported thereon, to an angle not greater than the angle of the arc of the semi-circular cut-out and thereby prevent possible injury to the wires. However, if the wires are encased in or provided with a suitably durable protective cover or sleeve these stop pins may be omitted if desired.

Figure 2:
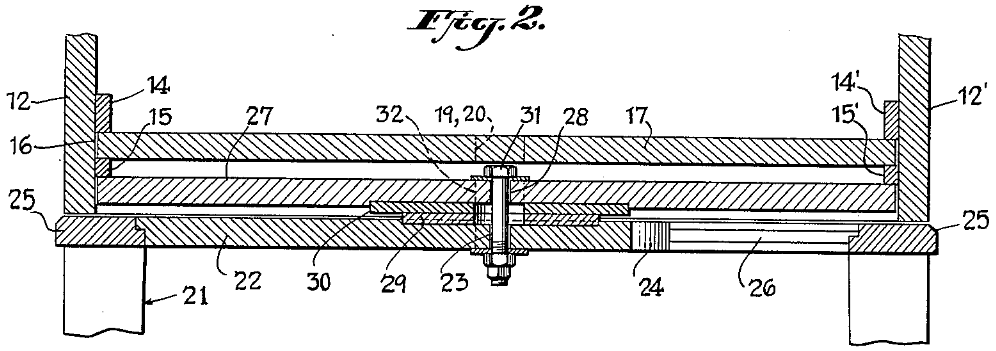
Fig. 2 is a transverse sectional view taken on line 2—2 of Fig. 1.

The peripheral dimensions of the turntable plate 27 are only slightly less than the peripheral dimensions of the inside of the cabinet 10 as defined by sides 12 and 12′ and the cross pieces such as 13. Therefore, as shown in Figs. 1 and 2, the cabinet 10, when placed in position upon the turntable plate 27, is supported thereon by lower slat members 15 and 15′ which rest upon the outer edges of turntable plate 27 and which are so spaced from the lower edges of the cabinet 10 to insure sufficient clearance between the cabinet 10 and the top section 22 of the turntable stand 21 as to permit free rotation of the cabinet. In actual use, a telephone and a radio, for example, are satisfactorily positioned on shelves 17 and 18, respectively, each of the said devices facing the open end on that side of the cabinet 10 in which it is located. The lead-in wires for these devices are led down between the opposed indentations 19 and 20 on the inner edges of shelves 17 and 18, through the space between the said shelves and the turntable plate as shown in Fig. 2 to the hole 32 in turntable plate 27, through hole 32 and through the semi-circular cut-out 24 in the top section 22 of the turntable stand 21 to a suitable outside source of electricity.

A modification of the means for limiting the extent of the rotation of the turntable plate 27, or of a cabinet supported thereon, is shown in Fig. 4*a* in which the structure is identical with that previously described except as to the features to be described below: the corresponding parts being designated with like numerals with the prime (′) suffix added. Instead of the pins 32*a*—32*b* of Fig. 4, the stop member of this modification comprises a tube-like member 132 which is firmly positioned in hole 32′. The lower portion 132*a* of said tube-like member extends downwardly from the under surface of turntable plate 27′ a distance sufficient to enter into the semi-circular cut-out, such as 24 of Fig. 4, when the turntable plate is positioned upon the top section 22. In the modification shown, the width of the semi-circular cut-out 24 is somewhat greater than the outer diameter of tube-like member 132 to permit free movement of said tube-like member within the confines of said semi-circular cut-out. Preferably the tube 132 is provided with a diagonal or spiral slot 132*b* to permit the insertion of wires therethrough without necessitating the disconnection of the wires.

Fig. 6 discloses a modification of a turntable support made in accordance with the present invention. As shown therein, a turntable stand top section 34 is provided having a semi-circular cut-out 35 therein whose center of curvature coincides with the axis of rotation of a turntable plate 38 which is supported in spaced parallel relation upon said stand top section 34 as hereinafter described. The top section 34 has a hole 36 centered on said axis of rotation and adapted to receive in close fitting relation a tube-like member 37 which is threaded at either end. Suitable lock nuts 37*a*—37*b* fitting the threaded portion of the tube-like member are utilized to fixedly retain said tube-like member in position in the top section 34. A turntable plate 38 which serves as the carrier for a cabinet such as shown in Fig. 1 is also provided having a hole 39 in the center thereof which is only slightly larger than the outside diameter of tube-like member 37, and also having a stud 40 on its underside which is radially spaced from the said axis of rotation a distance equal to the radius of curvature of the semi-circular cut-out 35. The tube-like member 37 extends beyond the upper surface of the top section 34 to receive turntable plate 38 and to act as a spindle therefore when said turntable plate is positioned upon top section 34 of the turntable stand. A suitable lock nut 37*c* fitting the upper threaded portion of the tube-like member 37 may be utilized to loosely retain the turntable plate 38 upon the top section 34. Bearing means similar to that shown in Fig. 5 is also provided to support the turntable plate 38 on top section 34 to permit rotation of the turntable plate. When the pieces are assembled, the stud 40 extends down into the semi-circular cut-out 35 and thus limits the extent of the rotation of the turntable plate 38 to the angle of the arc of the semi-circular cut-out 35. In the construction shown, the wires such as W for the electrical devices contained in the cabinet are satisfactorily led directly from the interior of the cabinet through the tube-like member 37 to an outside source.

The embodiment of the invention illustrated in Fig. 6 lends itself to further modification. As mentioned hereinbefore, some types of the various electrical devices which are adapted to be carried in the turntable cabinet construction described need not be withdrawn from the cabinet for ready accessibility or for free use thereof. Therefore, the slidable shelf construction of the cabinet need not be utilized. In such case, turntable plate 38 may be rigidly connected to the sides 12 and 12′ of the cabinet to form a part of the cabinet and to constitute the bottom thereof. The undersurface of turntable plate 38 is preferably flush with the lower edges of sides 12 and 12′ to insure that sufficient clearance is maintained between the cabinet and the top section 34 of the turntable stand to permit rotation of the cabinet.

The present invention thus provides a turntable cabinet construction suitably adapted to contain a radio and a telephone, for example, or two similar electrical devices, and which is also adapted to be turned by mere manual manipulation so as to bring either of such devices into the same relative position with respect to the user for ready accessibility and convenient use thereof. By the present construction, indiscriminate turning or excessive turning of the cabinet in any one direction is automatically prevented, thereby substantially avoiding any of the unpleasant and possibly dangerous situations which could arise with respect to the electrical wires were the cabinet free to rotate continuously in either direction.

While the forms of construction herein described constitute preferred embodiments of the invention, it is to be understood that the invention is not limited to these precise forms of construction, and that changes may be made therein without departing from the scope of the invention which is defined in the appended claims.

What is claimed is:

1. A turntable cabinet for devices such as a radio, telephone or the like comprising a cabinet having a top, sides, and a bottom, the bottom of said cabinet having an opening therein, a stand for said cabinet having a horizontal top section, said top section having a semi-circular slot therein so disposed that the center of curvature of said slot coincides with the axis of rotation of said cabinet, a turntable plate supporting said cabinet and disposed above said stand top section in parallel spaced relation thereto, said turntable plate having a hole therein radially spaced from the axis of rotation a distance equal to the radius of curvature of the semi-circular slot portion of said stand top section, said cabinet bottom opening being aligned with said plate hole stop means in cooperative position between said turntable plate and said top section for limiting the angle of rotation of said turntable plate and cabinet and for restricting the traverse of said hole during rotation of said turntable plate to the angle defined by the arc of said semi-circular slot, whereby electrical conductors for such devices may be passed through said hole and slot into said cabinet through the bottom opening and means for rotatably supporting said turntable plate on and with respect to said stand top section including means for pivotally connecting said turntable plate and said stand top section for maintaining centered relation therebetween during rotation of said cabinet about said axis of rotation.

2. A turntable cabinet for devices such as a radio, telephone or the like comprising a cabinet having a top and sides, the inner lower portions of said sides having upper and lower parallel slat members forming guide-ways, a first shelf mounted in said guide-ways to form first section of the bottom of said cabinet, a second shelf mounted in said guide-ways to form a second section of the bottom of said cabinet, said first shelf and said second shelf having opposed indentations on their inner edges, a stand for said cabinet having a horizontal top section, said top section having a semi-circular slot therein so disposed that the center of curvature of said slot coincides with the axis of rotation of said cabinet, a turntable plate supporting said cabinet and disposed above said stand top section in parallel spaced relation thereto, said turntable plate having a hole therein radially spaced from the axis of rotation a distance equal to the radius of curvature of the semi-circular slot portion of said stand top section, stop means projecting from the under surface of said turntable plate and cooperating with said semi-circular slot to limit the extent of rotation of said turntable plate and cabinet to an angle not greater than the angle of the arc of said semi-circular slot and to restrict the traverse of said hole during rotation of said turntable plate to the angle defined by the arc of said semi-circular slot, whereby electrical conductors for such devices may be passed through said hole and slot into said cabinet bearing means rotatably supporting said turntable plate on said stand top section, and spindle means pivotally connecting said turntable plate and said stand top section for maintaining centered relation therebetween during rotation of said cabinet about said axis of rotation.

3. A cabinet according to claim 1 further comprising, said plate and top section each having a slot with a replaceable filler member extending from the periphery to the hole and slot of said plate and top section, respectively, for the insertion of said conductors.

References Cited in the file of this patent

UNITED STATES PATENTS

| | | |
|---|---|---|
| 1,207,532 | Fullerton | Dec. 5, 1916 |
| 2,047,516 | Lutsche | July 14, 1936 |
| 2,075,881 | Bekius | Apr. 6, 1937 |
| 2,571,903 | Loewi | Oct. 16, 1951 |
| 2,643,924 | Albans | June 30, 1953 |